(12) United States Patent
Volgmann et al.

(10) Patent No.: US 11,905,820 B2
(45) Date of Patent: *Feb. 20, 2024

(54) METHOD AND APPARATUS FOR DAMPING/ABSORBING ROTATIONAL VIBRATIONS/OSCILLATIONS

(71) Applicant: Scientific Drilling International, Inc., Houston, TX (US)

(72) Inventors: Marco Volgmann, Braunschweig (DE); William E. Denzel, Templeton, CA (US)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 573 days.

This patent is subject to a terminal disclaimer.

(21) Appl. No.: 17/128,045

(22) Filed: Dec. 19, 2020

(65) Prior Publication Data

US 2021/0189859 A1 Jun. 24, 2021

Related U.S. Application Data

(60) Provisional application No. 62/976,898, filed on Feb. 14, 2020, provisional application No. 62/952,233, filed on Dec. 21, 2019.

(51) Int. Cl.
*F16F 15/14* (2006.01)
*F16F 15/173* (2006.01)
(Continued)

(52) U.S. Cl.
CPC .......... *E21B 47/017* (2020.05); *E21B 17/073* (2013.01); *F16F 15/145* (2013.01); *F16F 15/173* (2013.01)

(58) Field of Classification Search
CPC ...... F16F 15/14; F16F 15/145; F16F 15/1457; F16F 15/167; F16F 15/173; E21B 17/07; E21B 17/073; E21B 17/076; E21B 47/017
(Continued)

(56) References Cited

U.S. PATENT DOCUMENTS 2,814,462 A 11/1957 Jarnett
2,953,351 A 9/1960 Bodine et al.
(Continued)

OTHER PUBLICATIONS

International Search Report and Written Opinion issued in PCT App. No. PCT/US2020/66263 dated Apr. 28, 2021 (12 pages).

*Primary Examiner* — Thomas J Williams
(74) *Attorney, Agent, or Firm* — Ewing & Jones, PLLC

(57) ABSTRACT

A vibration damping device for use with downhole electronics may comprise: a device housing mechanically coupled to the downhole electronics and defining a receptacle; and an inertia element movably supported in the receptacle; wherein the volume of the receptacle is greater than the volume of the inertia element so as to define an interstitial volume therebetween and wherein the interstitial volume is occupied by a fluid or an elastomer. A method for tuning a downhole torsional damping device to match a desired downhole electronics may comprise a) calculating a set of natural frequencies and mode shapes for the downhole electronics, b) selecting a desired frequency from the calculated natural frequencies, c) tuning the damping device characteristics to match the selected frequency, d) using the mode shapes to place the damping device. The mode shapes may include antinodes and step d) includes positioning a damping device at an antinode.

11 Claims, 8 Drawing Sheets

(51) Int. Cl.
*E21B 47/017* (2012.01)
*E21B 17/07* (2006.01)

(58) Field of Classification Search
USPC .................................................. 188/378, 379
See application file for complete search history.

(56) References Cited

U.S. PATENT DOCUMENTS

| | | | |
|---|---|---|---|
| 3,265,091 A | 8/1966 | Jarnett | |
| 4,123,675 A * | 10/1978 | Moskowitz | H02K 37/22 |
| | | | 310/51 |
| 4,428,108 A | 1/1984 | Acree et al. | |
| 4,905,776 A | 3/1990 | Beynet et al. | |
| 5,058,453 A | 10/1991 | Graham et al. | |
| H2237 H * | 2/2010 | Barrett | 188/378 |
| 7,997,380 B2 * | 8/2011 | Arian | E21B 47/16 |
| | | | 181/102 |
| 8,632,096 B1 * | 1/2014 | Quinn | F16F 9/53 |
| | | | 280/771 |
| 11,142,962 B2 * | 10/2021 | Simanowski | F16F 7/112 |
| 11,566,477 B2 * | 1/2023 | Volgmann | E21B 17/07 |
| 11,761,271 B2 * | 9/2023 | Leicht | E21B 17/073 |
| | | | 175/56 |
| 11,773,659 B2 * | 10/2023 | Volgmann | E21B 17/07 |
| | | | 464/20 |
| 2010/0139977 A1 | 6/2010 | Watkins et al. | |
| 2015/0346234 A1 * | 12/2015 | Campbell | E21B 47/12 |
| | | | 73/152.43 |
| 2017/0037685 A1 * | 2/2017 | Strachan | E21B 10/00 |
| 2017/0056977 A1 * | 3/2017 | Eichelberger | F16F 7/1034 |
| 2021/0189859 A1 * | 6/2021 | Volgmann | E21B 47/017 |
| 2021/0404268 A1 * | 12/2021 | Simanowski | F16F 7/108 |
| 2022/0195812 A1 * | 6/2022 | Volgmann | E21B 17/076 |

* cited by examiner

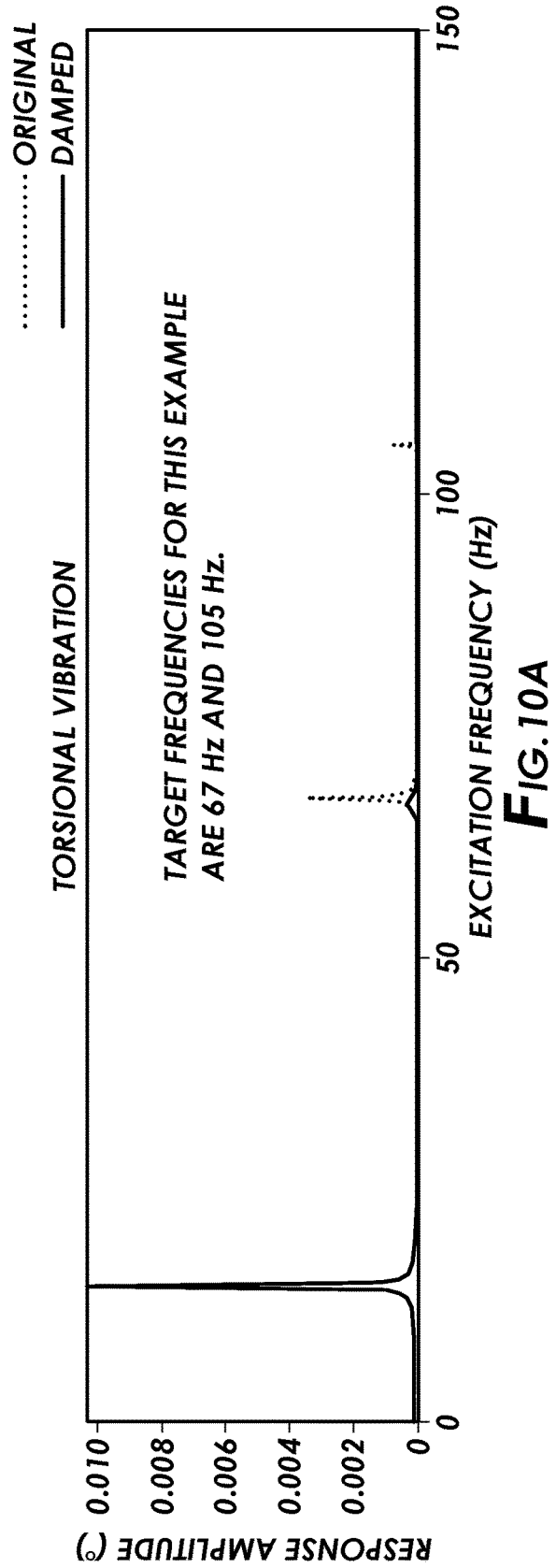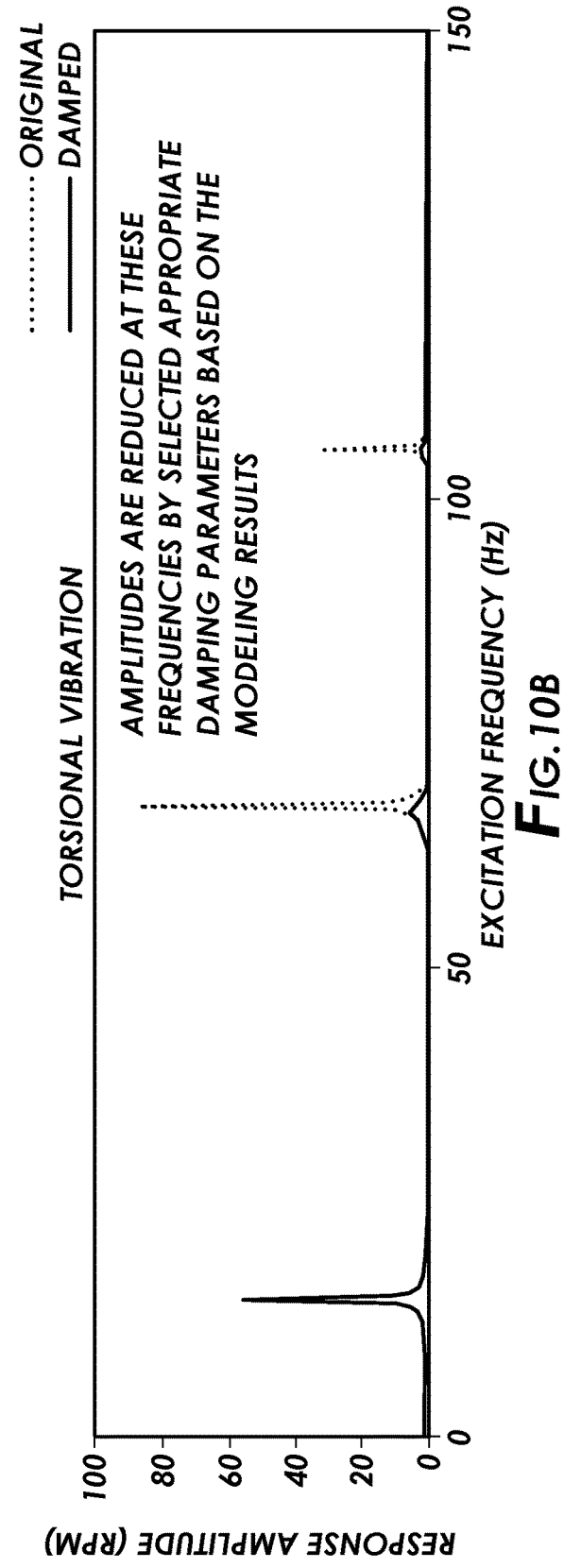

METHOD AND APPARATUS FOR DAMPING/ABSORBING ROTATIONAL VIBRATIONS/OSCILLATIONS

CROSS REFERENCE TO RELATED APPLICATIONS

This application is a nonprovisional application which claims priority from U.S. provisional application No. 62/952,233, filed Dec. 21, 2019, and U.S. provisional application No. 62/976,898, filed Feb. 14, 2020, each of which is incorporated by reference herein in its entirety.

TECHNICAL FIELD/FIELD OF THE DISCLOSURE

The present disclosure relates generally to damping vibrations or rotational oscillations during drilling operations using typical drilling systems, such as rotary steerable systems, and specifically to inertial damping systems converting vibration energy into heat energy, resulting in the desired damping effect.

BACKGROUND OF THE DISCLOSURE

In hydrocarbon drilling operations, boreholes are typically drilled by rotating a drill bit attached to the end of a drill string. The drill bit can be rotated by rotating the drill string at the surface and/or by a fluid-driven downhole mud motor, which may be part of a bottom hole assembly (BHA). For example, a mud motor may be used for directional drilling operations when used in conjunction with measurement while drilling (MWD) and/or logging while drilling (LWD) components. The combination of forces and moments applied by the drill string and/or mud motor and forces and moments resulting from the interaction of the drill bit with the formation can have undesirable effects on the drilling system, including a reduction in the effectiveness of the cutting action, a reduction in the life of the BHA components, damage to BHA components, and/or interference in measuring various drilling parameters.

SUMMARY

To mitigate such negative effects, BHA components such as the MWD electronics may be equipped with one or more damping systems to draw vibration energy from the BHA and thereby damping the effects associate with torsional vibration excitation.

According to some embodiments, a vibration damping device for use with one or more downhole electronics having a longitudinal axis, may comprise a housing mechanically coupled to the downhole electronics, the housing defining a receptacle having a volume, and an inertia element movably supported in the receptacle and having a volume, a mass, and a non-zero moment of inertia about the longitudinal axis. The volume of the receptacle may be greater than the volume of the inertia element so as to define an interstitial volume therebetween and the interstitial volume may be occupied by a fluid or an elastomer.

The inertia element may be supported within the receptacle in a manner that allows the inertia element to rotate about the longitudinal axis without contacting the walls of the receptacle, further including at least one of a longitudinal bearing and a radial bearing positioned between the inertia element and the housing. The housing may comprise an annular wall having an outer radius and a central bore therethrough and the receptacle may be defined in the annular wall. In some embodiments, the housing may be integral to the downhole electronics, respectively the electronics' housing.

The inertia element may have an outer radius less than the outer radius of the annular wall and the inertia element may have an inner radius greater than the radius of the central bore, and the receptacle may be in fluid communication with the environment surrounding the housing. The device may further include a variable compensation volume, and the variable compensation volume may be in fluid communication with the receptacle.

The inertia element may have a shape selected from the group consisting of square toroids, tori, and azimuthally-spaced segments.

In some embodiments, a method for tuning a downhole torsional damping device to match at least one downhole electronics, in which the downhole torsional damping device may have a longitudinal axis and may include an inertia element and a damping fluid or elastomer, may comprise the steps of: a) calculating a set of natural frequencies and mode shapes for the downhole electronics based on the mechanical properties of the downhole electronics; b) selecting at least one desired frequency from the calculated natural frequencies; c) tuning the damping device characteristics to match the at least one desired frequency; and d) using the calculated mode shapes to place the damping device.

Step a) may comprise calculating a set of natural frequencies and mode shapes for a string of downhole electronics based on the mechanical properties of the downhole electronics and support members associated therewith. Step c) may comprise adjusting one or more properties selected from the group consisting of the mass of the inertia element, material density of the inertia element, moment of inertia of the inertia element to the longitudinal axis, shape of the inertia element, shape of the tool, density of the damping fluid, and viscosity of the damping fluid, and selecting a value that results in a damping tool frequency that most closely matches the desired frequency. The mode shapes may correspond to a calculated amplitude of vibration at each point along the tool and may include nodes and antinodes and step d) may include positioning a damping device at one or more antinodes.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 10A and 10B are plots of models illustrating damping of torsional vibration at target frequencies.

DETAILED DESCRIPTION

Figure 1:
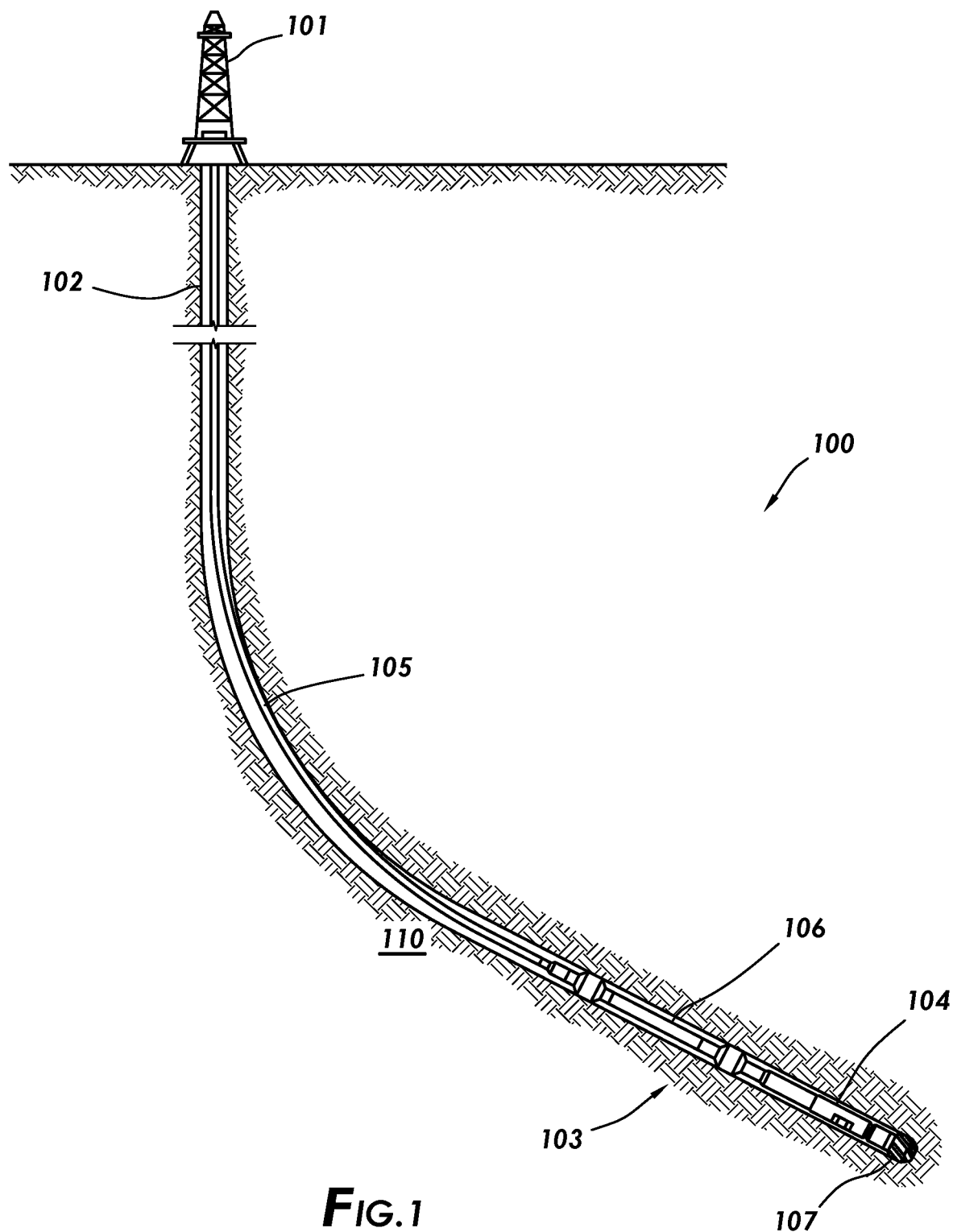
FIG. 1 is a schematic view of a drilling system in which embodiments of the current invention can be used.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring initially to FIG. 1, a drilling system 100 in which the present apparatus may be used may include a drilling rig 101 positioned above a wellbore 102 that extends into a subsurface formation 110. A drill string 105 may extend from drilling rig 101 into wellbore 102 and may terminate in a bottom hole assembly (BHA) 103. Drill string 105 may be driven by the surface equipment of the rig. In some embodiments, BHA 103 may include a drill bit 107, a motor 106, which may be a mud motor or other downhole motor, a measurement while drilling (MWD) system, a logging while drilling (LWD) system and/or a steerable system 104, which may be a rotary steerable system (RSS) which may include a MWD section. BHA 103 may optionally include various other devices, such as logging or measurement devices, communications devices, and the like. If present, steerable system 104 may be used to steer the bit as the wellbore is drilled. The rotational force (torque) required to rotate drill bit 107 can be provided a torque creating or applying apparatus, which may be a drill string 105, motor 106, or a combination thereof.

Figure 2:
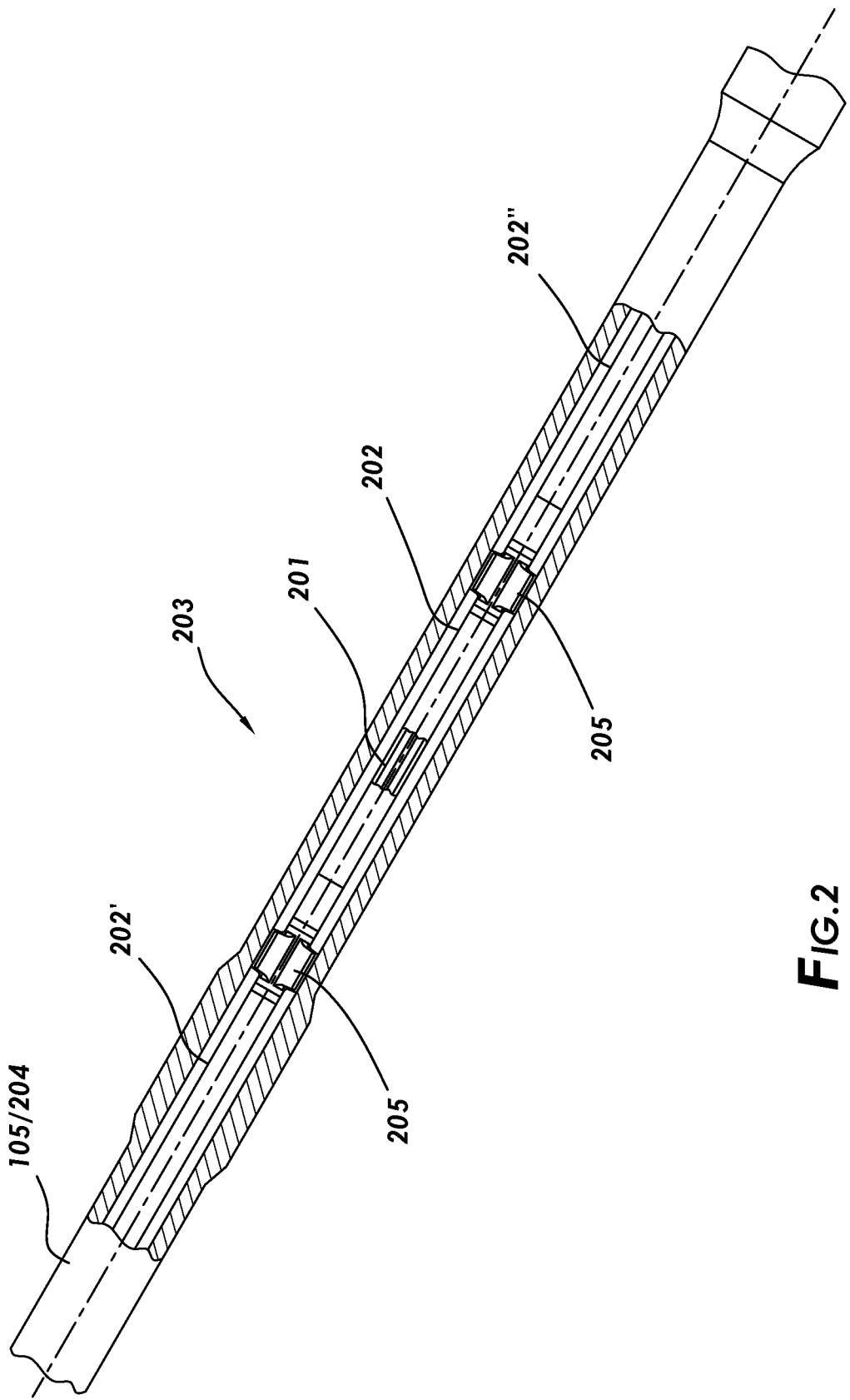
FIG. 2 is a cutaway view illustrating a possible location for a MWD running gear inside a drill collar of a BHA.

According to FIG. 2, in some embodiments, one or more downhole electronics 201 may be positioned inside a member of the drill string 105 for performing certain measurements while drilling the wellbore. In this example, a downhole electronics 201 is positioned inside a pressure barrel 202. One or more downhole electronics 201 and their pressure barrels 202 may be combined to create a string of downhole electronics 203 which is placed inside a drill collar 204 being part of the drill string 105. Coupling means 205 may also provide mechanical and electrical connections to pressure barrels 202' and 202" and the downhole electronics 201 contained therein, so as to create a string of downhole electronics 203. Coupling means 205 may also maintain pressure barrel 202 and the contained downhole electronics 201 in a centralized position inside drill collar 204. Coupling means 205 may have rigid and/or elastic components, such as a plurality of rubber centralizer fins. Depending on the type of coupling means 205, undesirable effects on the drilling system 100 such as vibrations or rotational oscillations may be transmitted on to the downhole electronics 201 thereby exciting certain natural frequencies of an individual downhole electronics 201 and/or of the string of downhole electronics 203.

Figure 3:
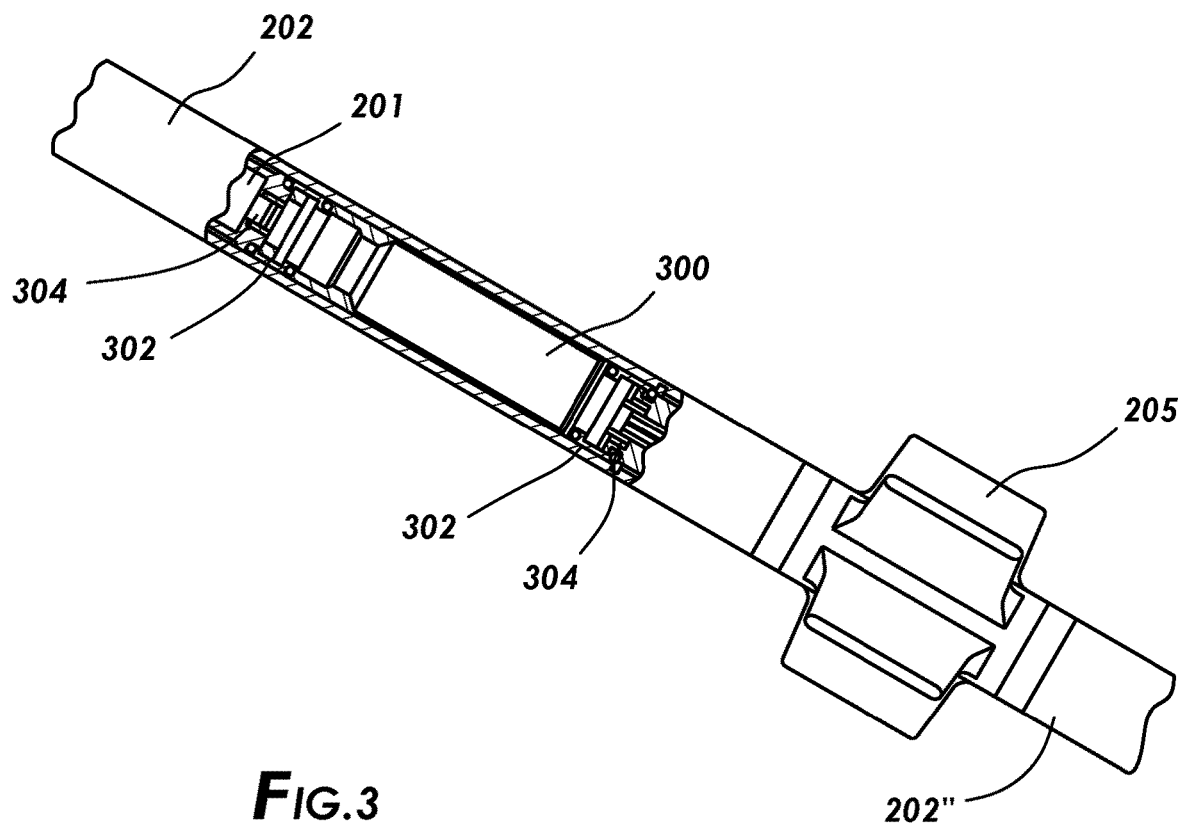
FIGS. 3-5 illustrate possible locations for a damping device in a downhole electronics.

According to FIG. 3, in some embodiments, one or more damping devices 300 may be positioned inside a pressure barrel 202. Furthermore, the damping device 300 may be positioned between and affixed to both the coupling means 205 and the downhole electronics 201. Therefore, the damping devices 300 may be equipped with mechanical connections 302 such as a lock nut, a clamp set, etc. and electrical connections 304 both matching the provided connections of the adjacent downhole electronics 201 and coupling means 205. Coupling means 205 may also be provided with mechanical and electrical connections to combined pressure barrels 202 and 202" and the downhole electronics 201 contained therein, creating a string of downhole electronics 203 as described.

Figure 4:
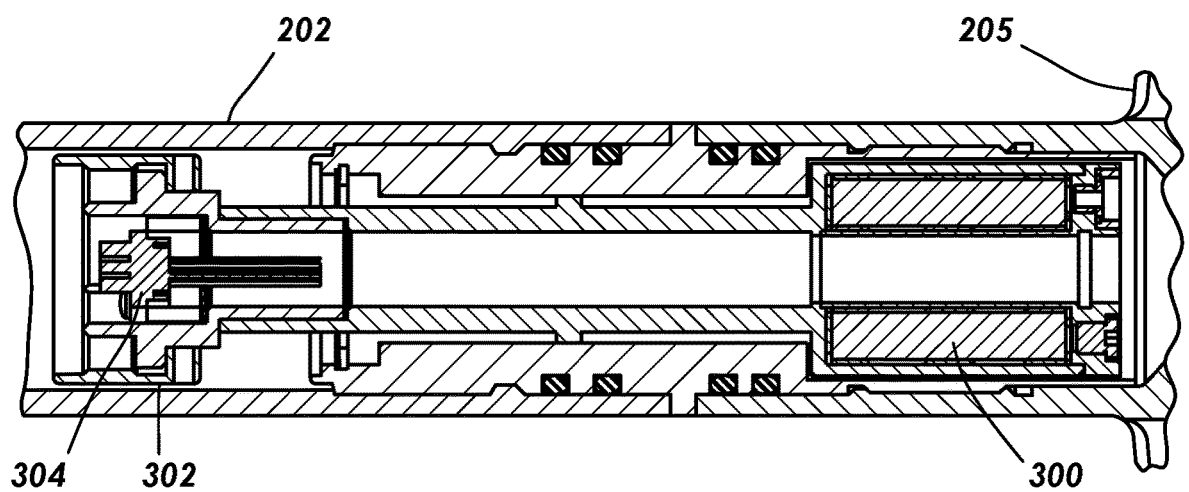

According to FIG. 4, in some embodiments, one or more damping devices 300 may be positioned inside the coupling means 205 to which the downhole electronics 201 is affixed to. In this embodiment, damping device 300 may be connected to the coupling means 205 by various connection methods including, threads, glued joints, or a common form-locked and/or force-locked connection, such as a press fit between the cylindrical surface of damping device 300 and a coaxial bore in said coupling means 205, a serration, or the like.

Figure 5:
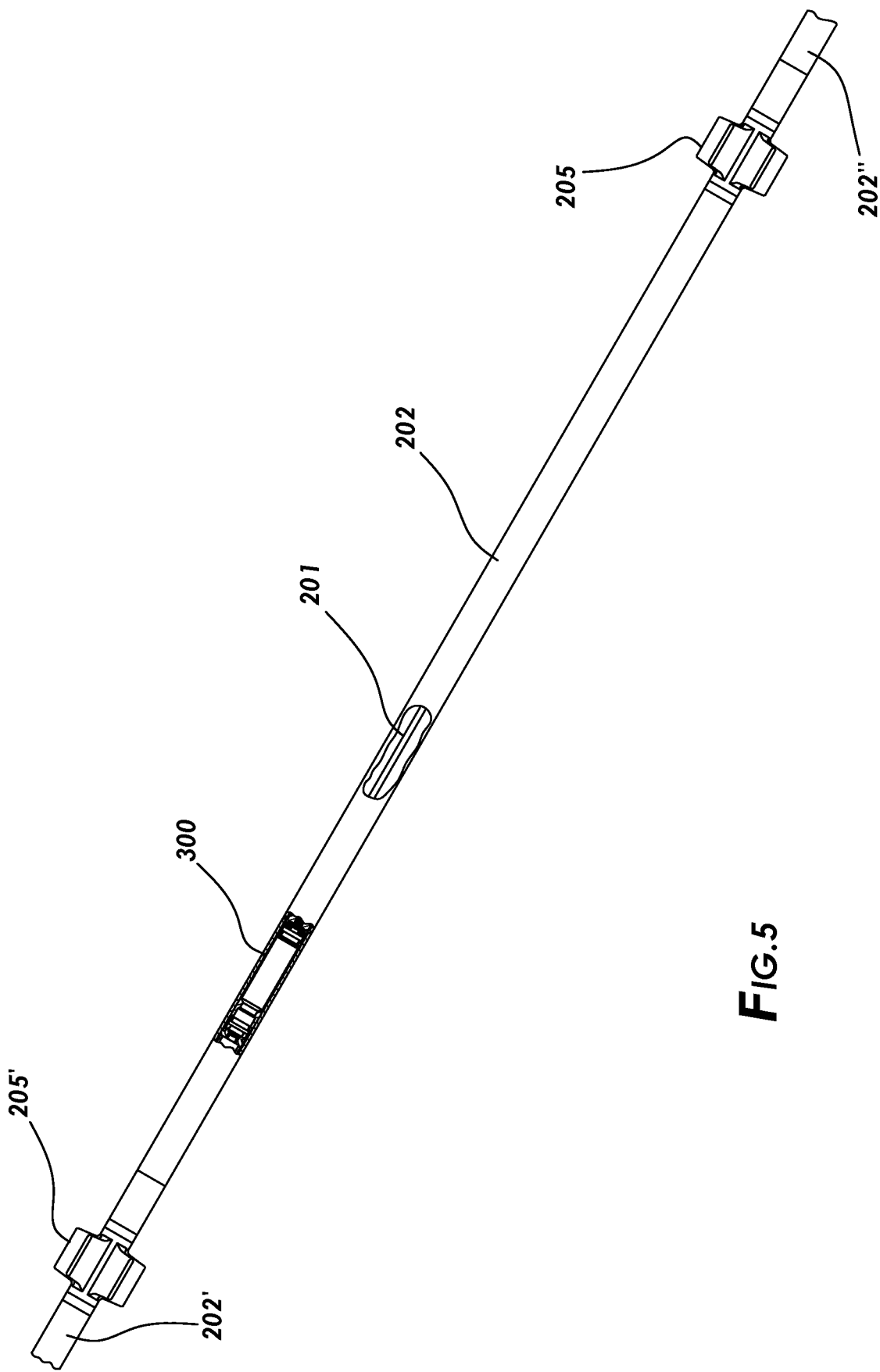

According to FIG. 5, in another embodiment, one or more damping devices 300 may be positioned at the opposite end of the downhole electronics 201 internal to the pressure barrel 202, which is supported at that position but rotationally free along its longitudinal axis.

Figure 6:
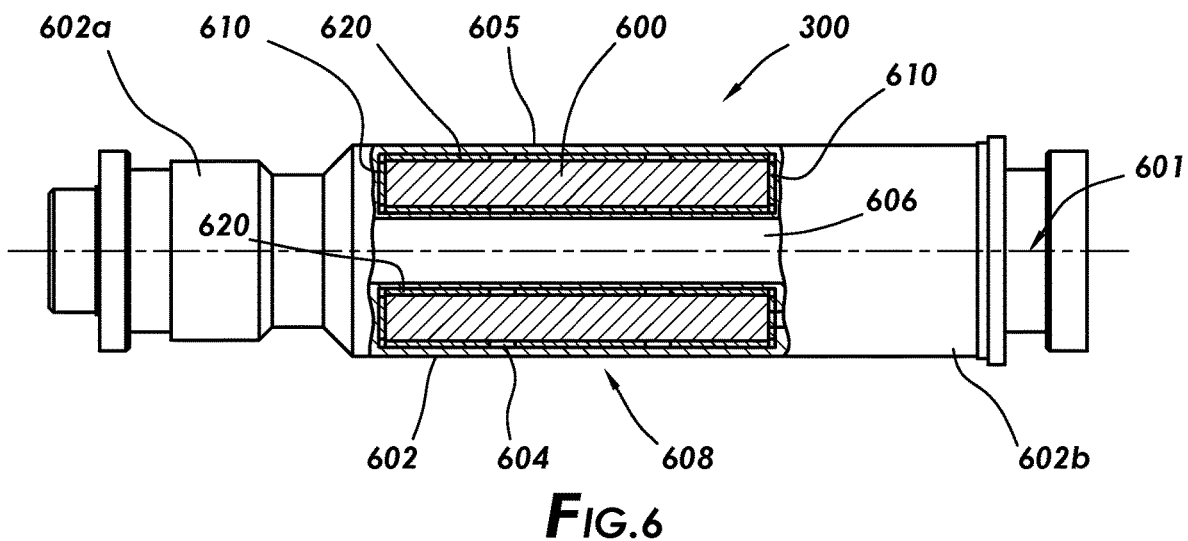
FIGS. 6-7 are a cross-sections illustrating embodiments of the invention.

For FIGS. 3-5, the position of the at least one damping devices 300 is a matter of design preference, and/or of natural frequency and mode shape. Furthermore, the embodiments illustrated by FIGS. 3-5 can also be combined in different ways (see for example FIG. 8). Referring now to FIG. 6, some embodiments of damping device 300 comprise a housing 602, a receptacle 604 defined within housing 602, and at least one component with significant torsional inertia, illustrated as inertia element 600, disposed in receptacle 604. In order to be effective, inertia element 600 has certain minimum desired inertia. The minimum desired inertia depends on the energy to be dissipated and can be adapted to the specific application.

Housing 602 may be a solid body or have a desired shape. By way of example, in some embodiments, housing 602 may include an annular housing wall 605 defining receptacle 604 and having a coaxial bore 606 and a coaxial cylindrical outer surface 608, where the coaxial bore 606 may serve as a wire feed through. The thickness of housing wall 605 is a matter of design preference. Inertia element 600 can be any shape having a non-zero moment of inertia about the longitudinal (rotational) axis 601 of housing 602. By way of example, inertia element 600 may be a square toroid (as illustrated), a torus, a plurality of azimuthally-spaced segments, or other distribution of mass within housing 602.

In some embodiments, receptacle 604 may be configured such that the volume of receptacle 604 is greater than the volume of inertia element 600 so as to define an interstitial volume therebetween. In such embodiments, the interstitial volume, i.e., the volume of receptacle 604 that is not occupied by inertia element 600, may be filled with a fluid as set out in detail below. Additionally, radial and/or axial bearings may also be positioned in the volume defining specific gap(s) between the housing 602 and the inertia element 600. Inertia element 600 can be supported within receptacle 604 in a manner that allows inertia element 600 to rotate about axis 601 without contacting the walls of receptacle 604. Still referring to FIG. 6, in some embodiments, the support for inertia element 600 may include longitudinal bearings 610 and/or radial bearings 620 and a fluid. Longitudinal bearings 610 may be positioned between the end(s) of inertial element 600 and the inner surface of receptacle 604. Radial bearings 620 may be positioned between the inside and/or outside of inertial element 600 and the inner surface of receptacle 604. Bearings 610, 620 can be sliding bearings or roller bearings. If present, longitudinal and/or radial bearings 610, 620 can be configured such that inertia element 600 rotates around the centerline of the damping device 300. If present, longitudinal and/or radial bearings 610, 620 can also be configured such that a certain predetermined gap between housing and inertia ring is maintained. In some embodiments, inertia element 600 is disposed in housing 602 in a manner that allows at least some rotation of inertia element 600 about axis 601 relative to housing 602. In some embodiments, rotation of inertia element 600 about axis 601 is not restricted; in such embodiments, it is possible for inertia element 600 to rotate through 360 degrees.

Housing 602 may comprise a single element or may comprise an assembly of two or more parts, which may, by way of example only, be welded together. The embodiment of FIG. 6 includes such a two-part housing 602, comprising the two parts 602a and 602b being welded together (not shown).

In some embodiments, housing 602 may include a pressure compensation feature (not shown). If present, the pressure compensation feature may comprise a variable compensation volume. The variable compensation volume may comprise a compensation piston housing with a compensation piston moveably mounted therein. Together, the compensation piston housing and the compensation piston define a variable compensation volume. In some embodiments, the compensation volume may be in fluid communication with receptacle 604 and thus filled with the same fluid as the interstitial volume. Movement of the compensation piston inside the compensation piston housing adjusts the compensation volume so as to achieve a pressure equilibrium between the inside and the outside of damping device 300.

Figure 7:
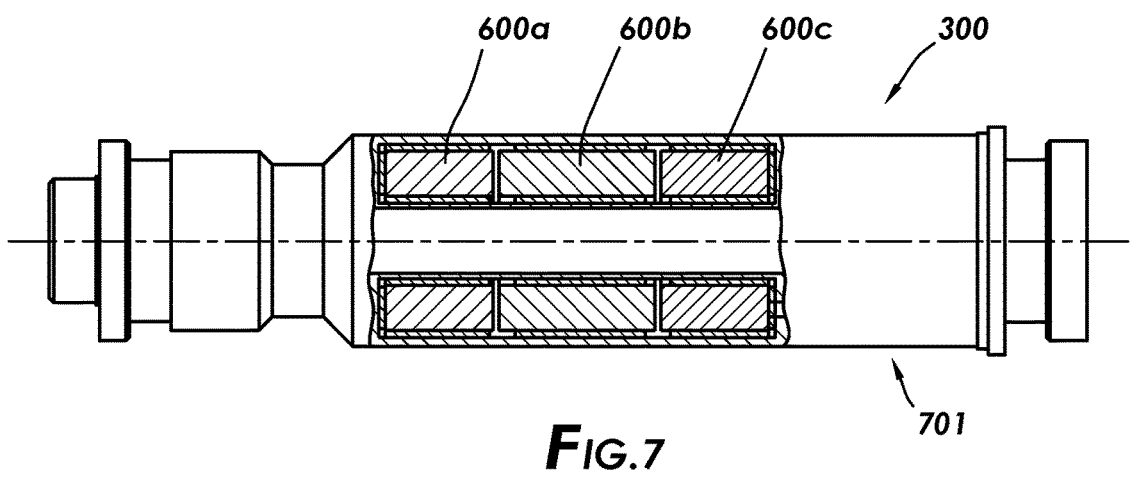
Figure 8:
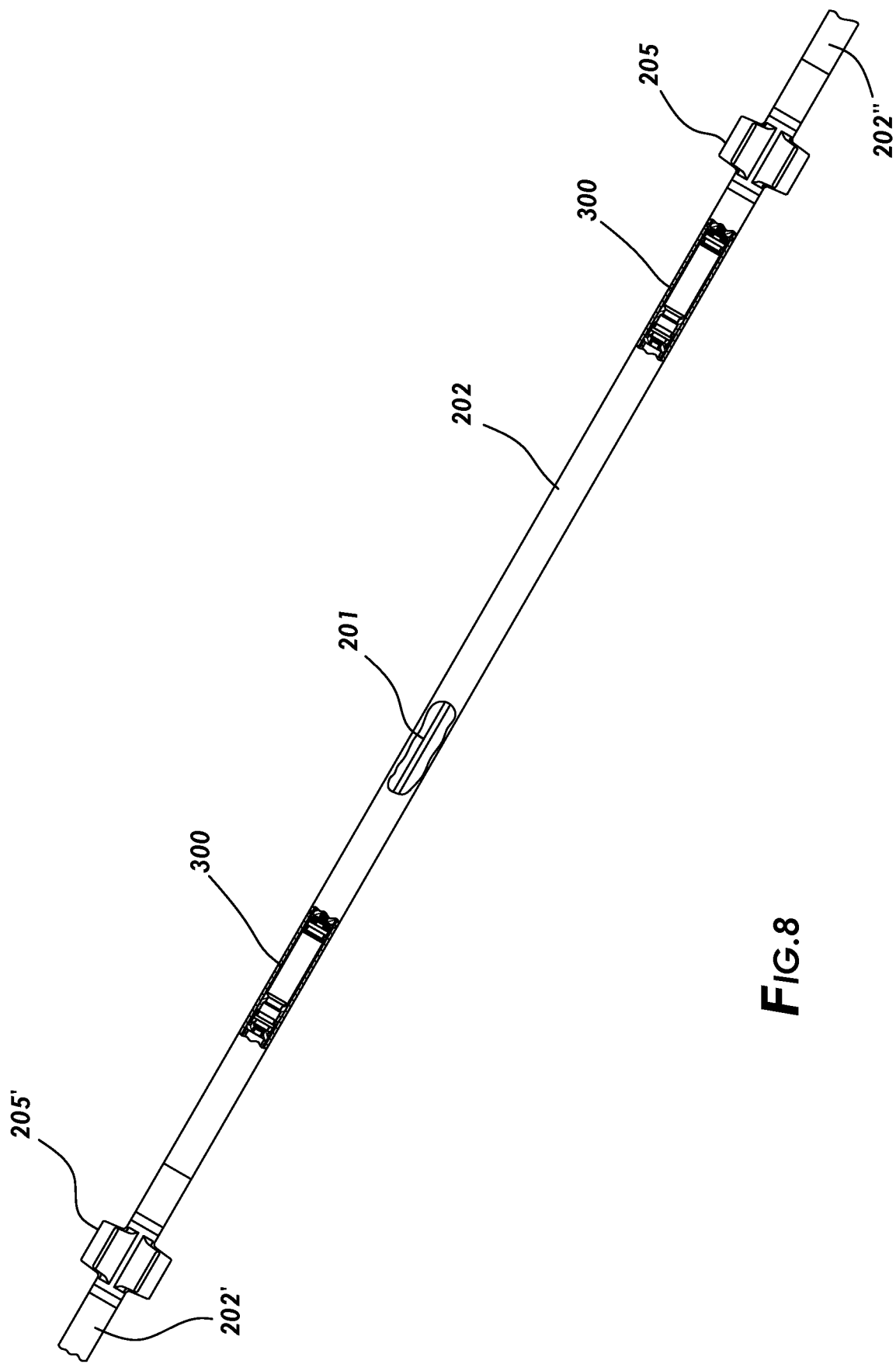
FIG. 8 is a cross-section and isometric cutaway view illustrating another embodiment of the invention.

Referring briefly to FIG. 7, in other embodiments, inertia element 600 may be split into two or more individual bodies, such as those illustrated at 600a, 600b, and 600c. The individual bodies may differ in their individual inertias by i) having a different volume, ii) being made of materials having different densities, iii) having different moments of inertia, or a combination of these options. Alternatively, or in addition to splitting inertia element 600 within one damping device 300, two or more damping devices 300 may be positioned within the string of downhole electronics 203 as illustrated in FIG. 8.

Referring to FIG. 6-7, regardless of the configuration of the inertia element 600 and receptacle 604, in some embodiments the interstitial volume between inertia element 600 and receptacle 604 may be filled with a fluid. In such instances, the portion of receptacle 604 that is not occupied by inertia element 600 may be occupied by a specifically selected damping fluid, such as a viscous medium including, for example, silicone oil. The damping fluid may have a high viscosity, such as for example up to 1,000,000 cSt at 25° C. In some embodiments, housing 602 and/or a pressure compensation feature may each include ports and channels (not shown) for evacuating or filling the pressure compensation feature 701 and the volume between housing 602 and inertia element 600 with damping fluid.

In still other embodiments, the portion of receptacle 604 that is not occupied by inertia element 600 may be occupied by an elastomer or one or more elastomeric bodies. The elastomer needs to have specific elastic and damping properties so that it can deform and dissipate energy while deforming. For both choices (a high viscosity fluid and an elastomer) it is required that the molecular chains of the material move relative to each other so as to dissipate energy. In addition, the elastomer is preferably attached to both the housing 602 and the inertia element 600 in order to transmit torque therebetween.

The presence of a viscous fluid or elastomer between the inertia element 600 and the housing 602 will result in internal friction whenever inertia element 600 moves relative to housing 602. As a result, some of the kinetic energy of the drill string 105, which may be transmitted by the coupling means 205 on to the string of downhole electronics 203, is dissipated as heat. Because of the transformation of vibrational energy into heat, the damping fluid may expand, increasing pressure inside receptacle 604. In some embodiments, housing 602 may contain the pressure and in some embodiments a pressure compensation feature 701 may be used to maintain a desired fluid pressure in receptacle 604. Alternatively or in additionally, the gap(s) between the outer diameter of housing 602 and adjacent equipment may be eliminated or filled with a thermally conductive material so as to enhance the conductance of heat away from housing 602 and create a path for removing the generated heat.

In some embodiments, damping device 300 can be tuned to at least one torsional natural frequency of the downhole electronics 201 comprising component(s) it is intended to protect, which may include, for example, electronics, batteries, sensors, or the like. In these embodiments, the downhole electronics 201 or component is modeled and its natural frequency(ies) is calculated.

Damping device 300 can be used to increase the reliability of a downhole electronics 201. Damping device 300 is especially advantageous in operations that have no designated vibration damping drill string member. Damping device 300 can be integrated into an individual downhole electronics 201 or a string of downhole electronics 203 as a separate device, and/or as a separate device positioned within another member of a string of downhole electronics 203, or by integrating its components into a torque-transmitting member of the downhole electronics string 203.

Figure 9:
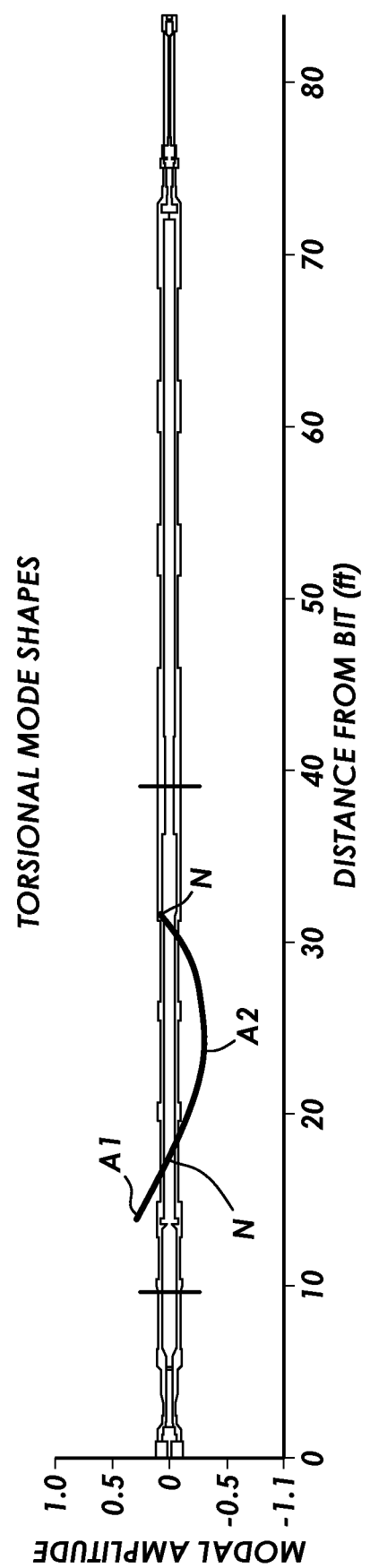
FIG. 9 is a schematic illustration of torsional vibrational nodes of part of a drill string.

According to some embodiments, damping device 300 can be adapted to a downhole electronics 201 thereof using the following steps:

a) Calculate the torsional natural frequencies, also referred to as Eigen Values or eigenfrequencies, and mode shapes (Eigen Vectors) based on the mechanical properties of the downhole electronics (ODs, IDs, Lengths, and Material Properties). The calculation may be based on a finite elements analysis or the like. In some embodiments, natural frequencies and mode shapes may be calculated for a string of downhole electronics. In such cases, the calculations could be based on the mechanical properties of the downhole electronics and any support members associated therewith.

b) Tune the damping device 300 characteristics to match the desired frequencies. Tuning the device may include varying one or more parameters including the inertia (mass, material density, lever to axis of rotation, etc.) and damping characteristics (type of fluid, fluid viscosity, shear gap width, shear gap length, etc.) of the damping device 300 and modeling or testing the device to determine its frequency response. In some instances, the target frequency may be from 30 Hz up to 3000 Hz. A system including a damping device 300 may be configured to damp vibrations at one or more frequencies. In some embodiments, damping devices tuned to different frequencies can be used to damp multiple (separate) frequencies. In other embodiments, a single damping device 300 that is capable of damping a broad range of frequencies can be used. The effective frequency range of a damping device 300 can be influenced by various parameters, as set out above.

c) Use the calculated mode shapes to position damping device 300 optimally along the string of downhole electronics so as to maximize the dampening effectiveness. As illustrated schematically in FIG. 9, for a given string of downhole electronics and frequency, a mathematical model can be used to calculate the amplitude of vibration at each point along the downhole electronics. As illustrated in FIG. 9, the amplitude will tend to vary between antinodes A1, A2, A3 . . . , i.e. points along the Eigen Vector in which the amplitude is a local maximum or minimum, along the length of the downhole electronics, with a node N (zero value) between each pair of adjacent antinodes. Depending on the string of downhole electronics and the support within the bottom hole assembly, the antinodes may increase or diminish in amplitude along the length of the downhole electronics 201.

In some embodiments, it may be advantageous to position a damping device 300 at each of one or more anti-nodes. In some instances, it may be desirable to position a damping device 300 close to or at the point with the largest absolute value of modal displacement. FIG. 10 illustrates damping of torsional vibration measured in degrees (FIG. 10A) and rpm (FIG. 10B).

The purpose of the present damping device is to protect downhole electronics from drilling loads that exceed detrimental magnitudes. In some instances, the device may be used for damping loads that occur during drilling operation, such as torque peaks and/or torsional accelerations/oscillations. Downhole electronics may include one or a plurality of said damping devices in different locations. The damping device can be an integral part of the downhole electronics, where all needed elements are integrated into readily available downhole electronics. It can also be added to the downhole electronics as a separate device, where all elements are integrated into on its own.

What is claimed is:

1. A vibration damping device for use with one or more downhole electronics, the downhole electronics having a longitudinal axis, the vibration damping device comprising:
   a device housing mechanically coupled to the downhole electronics, the device housing defining a receptacle having a volume and an inner surface, wherein the downhole electronics comprise a sensor, and wherein the device housing along with the downhole electronics together create a sensor string maintained in a centralized position inside a drill string;
   an inertia element movably supported in the receptacle and having a volume, a mass, and a non-zero moment of inertia about the longitudinal axis;
   wherein the volume of the receptacle is greater than the volume of the inertia element so as to define an interstitial volume therebetween and wherein the interstitial volume is occupied by a fluid or an elastomer.

2. The device of claim 1 wherein the inertia element is supported within the receptacle in a manner that allows the inertia element to rotate about the longitudinal axis without contacting the walls of the receptacle, further including at least one of a longitudinal bearing and a radial bearing positioned between the inertia element and the device housing.

3. The device of claim 2 wherein the device housing comprises an annular wall having an outer radius and a central bore therethrough and wherein the receptacle is defined in the annular wall.

4. The device of claim 3 wherein the device housing is integral with the downhole electronics.

5. The device of claim 3 wherein the device housing includes a variable compensation volume in fluid communication with the receptacle.

6. The device of claim 3 wherein a variable compensation volume is defined by a variable compensation housing, wherein the variable compensation housing is formed separately from the device housing, and wherein the variable compensation housing is received within the device housing.

7. The device of claim 2 wherein the inertia element has a shape selected from the group consisting of square toroids, tori, and azimuthally-spaced segments.

8. A method for tuning a downhole torsional damping device to match at least one desired downhole electronics, the downhole torsional damping device having a longitudinal axis and including an inertia element and a damping fluid or elastomer, comprising the steps of:
   a) calculating a set of natural frequencies and mode shapes for the downhole electronics based on the mechanical properties of the downhole electronics, wherein the downhole electronics comprise a sensor, and wherein the downhole torsional damping device along with the downhole electronics together create a sensor string maintained in a centralized position inside a drill string;
   b) selecting at least one desired frequency from the calculated natural frequencies;
   c) tuning the damping device characteristics to match the at least one desired frequency; and
   d) using the calculated mode shapes to place the damping device.

9. The method of claim 8 wherein step a) comprises calculating a set of natural frequencies and mode shapes for a string of downhole electronics based on the mechanical properties of the downhole electronics and support members associated therewith.

10. The method of claim 8 wherein step c) comprises adjusting one or more properties selected from the group consisting of the mass of the inertia element, material density of the inertia element, moment of inertia of the inertia element to the longitudinal axis, shape of the inertia element, shape of the tool, density of the damping fluid, and viscosity of the damping fluid, and selecting a value that results in a damping tool frequency that most closely matches the desired frequency.

11. The method of claim 8 wherein the mode shapes correspond to a calculated amplitude of vibration at each point along the tool and include nodes and antinodes and wherein step d) includes positioning a damping device at one or more antinodes.

* * * * *